June 14, 1938.  W. B. GRUBB, SR  2,120,590
AUTOMOBILE LOCK
Filed Oct. 14, 1936  2 Sheets-Sheet 1
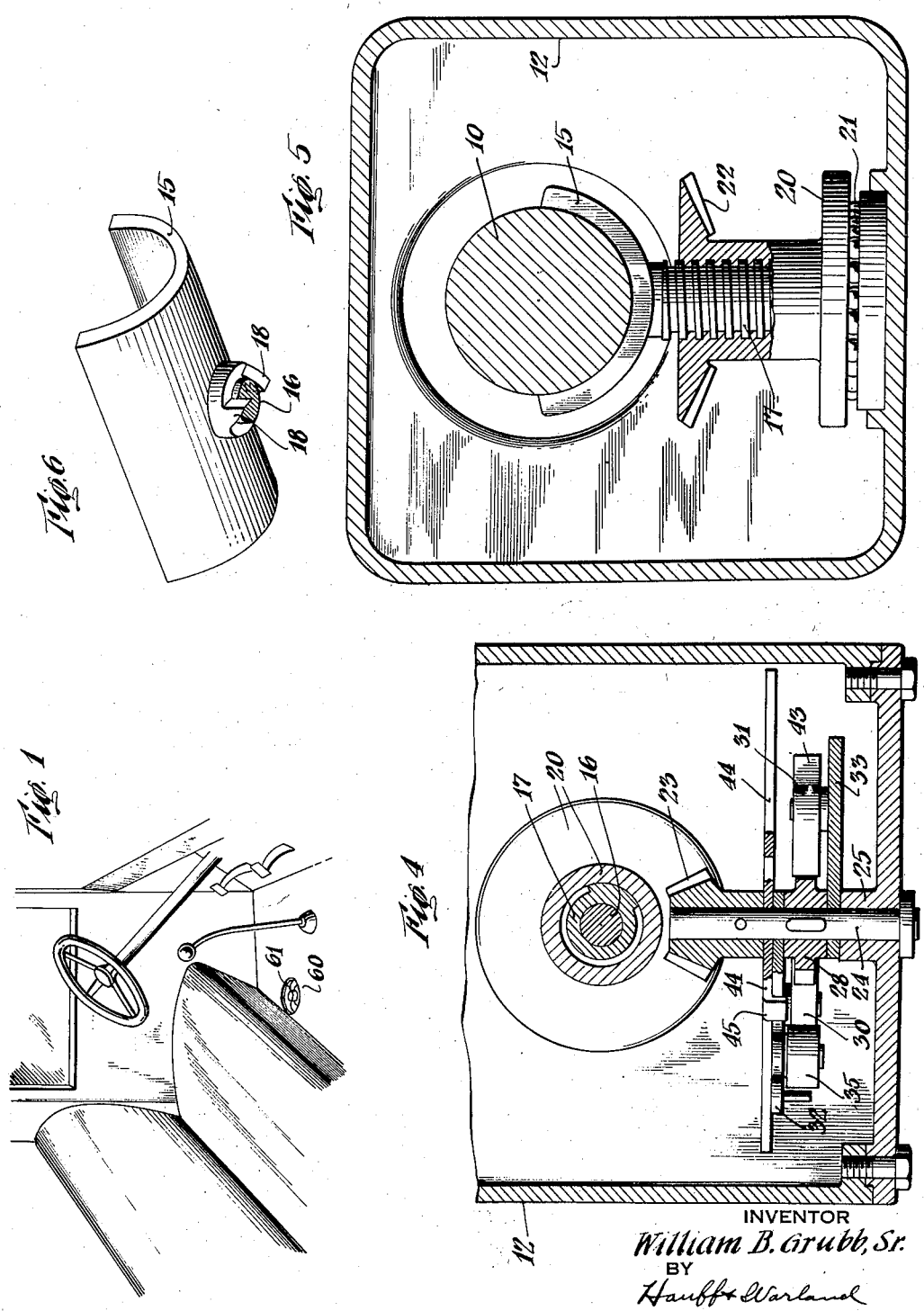
INVENTOR
William B. Grubb, Sr.
BY
Hauff & Warland
ATTORNEY

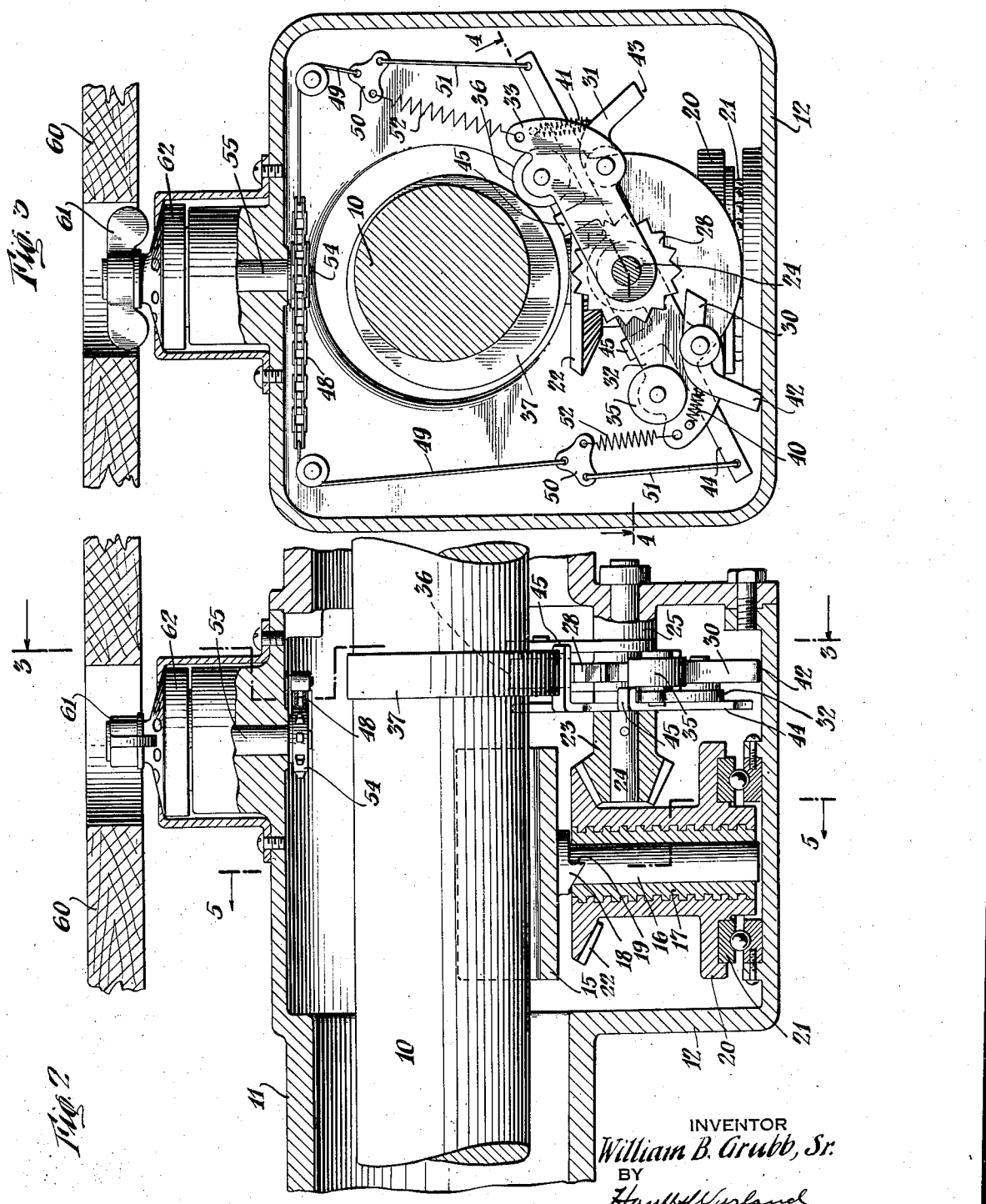

Patented June 14, 1938

2,120,590

UNITED STATES PATENT OFFICE 2,120,590

AUTOMOBILE LOCK

William B. Grubb, Sr., Ventnor, N. J., assignor of one-half to Winthrop White, Brooklyn, N. Y.

Application October 14, 1936, Serial No. 105,491

9 Claims. (Cl. 180—82)

This invention relates to locks for automobiles and the like and has for its purpose to provide a lock which becomes effective to stop the automobile after the same has advanced a predetermined distance.

An object of the invention is to provide a simple, compact device for the above purpose.

Another object is to provide an automobile lock which may be set, for example, in a garage and which, when set, will allow the car to be shifted about or driven out of the garage, but will become effective after the car has been moved a given distance to stop the same so as to prevent theft or unauthorized use thereof.

These objects and others which will be apparent as the nature of the invention is more fully disclosed are accomplished by providing a brake on the drive shaft of the automobile which is automatically applied when the drive shaft has rotated a predetermined amount. The operating means is shiftable into three positions, namely, a setting position, a release position and a neutral position. When the operating means is in the setting position, rotation of the drive shaft serves to apply the brake; when in the release position, rotation of the drive shaft serves to release the brake; when in neutral position, the entire device is inoperative and the drive shaft is permitted to rotate in the usual manner. A manual control is provided in a convenient position, such as on the floor of the automobile, for shifting the operating means as required. Locking means is provided for locking the operating means in any of the above mentioned positions.

Although the various novel features which are believed to be characteristic of this invention will be pointed out more particularly in the claims appended hereto, the invention itself, as to its objects and advantages and the manner of its operation, will be better understood by referring to the following description, taken in connection with the accompanying drawings, in which a preferred embodiment of the invention has been set forth for purposes of illustration.

In the drawings:

Fig. 1 is a perspective view of a portion of an automobile showing the position of the locking means therein;

Fig. 2 is a longitudinal section showing the brake mechanism as applied to the drive shaft of an automobile;

Fig. 3 is a transverse section taken along the line 3—3 of Fig. 2;

Fig. 4 is a section taken on the line 4—4 of Fig. 3;

Fig. 5 is a transverse section taken along the line 5—5 of Fig. 2; and

Fig. 6 is a perspective view of the brake shoe.

Referring to the drawings more in detail, the invention is shown as applied to an automobile having a drive shaft 10 which may be enclosed by a torque tube 11 of standard construction. The brake mechanism, to be described, is mounted in a housing 12 which may be secured to the torque tube 11 in any convenient location depending upon the available space. In the embodiment shown the housing 12 is mounted below the torque tube. It may, however, be located at various other positions, if desired.

In the embodiment shown, a brake shoe 15 is mounted within the housing 12 in a position to cooperate with the drive shaft 10. The brake shoe 15 is secured to a post 16 around which a threaded sleeve 17 is journalled. The post 16 is provided with teeth 18 which engage corresponding notches 19 formed in the top of said sleeve 17, to prevent the sleeve 17 from turning in one direction while permitting the same to turn in the other direction when the sleeve has been moved longitudinally a sufficient amount to clear the teeth 18.

The sleeve 17 is threaded in a rotating housing 20 which is mounted on the housing 12 by means of thrust bearings 21 and carries at its upper end a bevelled gear 22 meshing with a similar bevelled gear 23 which is pinned to a shaft 24 journalled in a boss 25 formed on the housing 12. The shaft 24 carries a ratchet wheel 28 by means of which the mechanism is operated. A pair of pawls 30 and 31 are mounted on arms 32 and 33, respectively, which are separately journalled about the shaft 24. These arms 32 and 33 carry rollers 35 and 36 which are adapted to selectively engage an eccentric 37 mounted on the drive shaft 10. Suitable springs 40 and 41 are provided to normally hold the pawls 30 and 31 in engagement with the ratchet wheel 28. The pawls 30 and 31 are provided at their ends with arms 42 and 43, respectively, adapted to contact with the housing 12 when the corresponding arm 32 or 33 is in retracted position so as to cause pivotal movement of the respective pawl about its arm and to hold the same out of engagement with the ratchet wheel 28. A control arm 44 is also journalled about the shaft 24. This control arm is provided with inturned lugs 45 which are adapted to engage the arms 32 and 33 for retracting the same from operating position. For actuating the control arm 44 there is provided a chain 48 connected by wires 49 to spreaders 50. The spreaders 50 are connected to the opposite ends of arm 44 by wires 51 and are connected by springs 52 to the arms 32 and 33 for normally holding said arms against the lugs 45.

The chain 48 is operated by a sprocket wheel 54 mounted upon a shaft 55 which is journalled in the housing 12 and is operated by a handle 61 accessible through the floor 60 of the automobile. A lock 62 of any convenient form may be provided to lock the shaft 55 in selected position for the purpose to be described. This lock may be key operated or may be of the combination type. A suitable combination lock for this purpose is described in my copending application Serial No. 98,500 for Combination lock. In that lock the handle 61 may serve as the handle for unlocking the mechanism and also for actuating the shaft 55.

The arm 44 may be set by suitable actuation of the handle 61 to bring either the roller 35 or the roller 36 into contact with the eccentric 37. With the arm 44 in horizontal position, both of these rollers will be out of contact with the eccentric 37 and the device will be inoperative. This intermediate position is the normal position of the mechanism when the automobile is running.

In order to lock the automobile against unauthorized use, the arm 44 is actuated by suitable manipulation of the handle 61 so as to bring the roller 35, for example, into contact with the eccentric 37. Thereupon, rotation of the drive shaft 10 causes the arm 32 to oscillate and by means of the pawl 30, causes the ratchet wheel 28 to rotate in a counter-clockwise direction as viewed in Fig. 3. This movement of the ratchet wheel 28 causes corresponding movement of the shaft 24 and through the bevelled gears 22 and 23 causes rotation of the rotating housing 20 in a clockwise direction as viewed in Fig. 4. The tooth 18, engaging the notch 19 in the sleeve 17, prevents rotation of said sleeve in a clockwise direction; consequently rotation of the housing 20 causes the sleeve, together with the post 16 and the brake shoe 15 to be threaded upwardly until the brake shoe 15 engages the drive shaft 10. This actuation will continue until sufficient force has been applied by the brake shoe 15 to interrupt the rotation of the drive shaft 10 and to bring the automobile to a stop.

In order to release brake shoe 15, the handle 61 is actuated first to unlock the mechanism and then to rotate the shaft 55 for reversing the position of the arm 44 so as to remove the roller 35 from engagement with the eccentric 37 and to bring the roller 36 into engagement therewith. Further rotation of the drive shaft 10 will thereupon cause the pawl 31 to actuate the ratchet wheel 28 in the reverse direction, thereby reversing the direction of rotation of the housing 20 and threading the sleeve 17 and the brake shoe 15 downwardly to release the brake shoe from the drive shaft.

If the brake has been set sufficiently tight to prevent movement of the drive shaft, it can be released slightly by actuating the handle 61 to reciprocate the arm 44 and the pawl 31 so as to step the ratchet wheel around until the brake is released sufficiently to permit rotation of the drive shaft, which then operates as above mentioned to fully release the brake. If the mechanism is left in releasing position with the roller 36 engaging the eccentric 37 after the brake shoe has been fully retracted, the sleeve 17 will cause the tooth 18 of the post 16 to ride up on the notches 19 and to permit free rotation of the sleeve. When this occurs, the brake shoe is in fully released position and the mechanism may be adjusted by manipulation of the handle 61 to remove both of the rollers 35 and 36 from engagement with the eccentric 37.

It is to be understood that a single brake shoe applied to the drive shaft has been shown for purposes of illustration only and that the details of construction may be varied as desired. In the normal running position, the arm 44 is held in horizontal position with both the rollers 35 and 36 inactive. Consequently, if there is no movement of the brake shoe 15, the entire device is held inoperative. When it is desired to lock the automobile, the handle 61 is suitably rotated to bring the roller 35 into engagement with the eccentric 37 and the device is then locked, either by a key or by suitable actuation of the handle 61, depending upon the type of lock employed. When in this position, the brake shoe is still removed from the drive shaft of the automobile and will not be applied thereto unless unauthorized use of the automobile takes place. It will be noted that a limited amount of forward movement may take place before the brake shoe becomes set against the drive shaft. Hence the device permits an automobile to be shifted about in a garage as may be required, while at the same time it ensures that the automobile cannot be driven any substantial distance.

If, while the automobile is locked, it has not been driven sufficiently to apply the brake shoe 15, it is only necessary to unlock the mechanism and actuate the handle 61 to restore the arm 44 to a neutral position before again using the automobile. If, however, it has been driven and the brake shoe has become set, it will be necessary, first, to set the arm 44 into releasing position with the roller 36 engaging the eccentric 37 so that the brake shoe will be retracted from engagement with the drive shaft. Thereafter, the arm 44 may be set into neutral position to permit normal operation of the automobile.

It is obvious that the device may be so geared as to permit any desired limited forward movement of the automobile before the brake shoe 15 is applied. This permits the mechanism to be set so that the car can be locked against theft or unauthorized use without interfering with the normal shifting about in the garage or the like or to permit the automobile to be removed from the garage in case of fire. The operator can, thus, personally lock the automobile when leaving it in the garage without interfering with the routine manipulation thereof and may be assured that no unauthorized use of the automobile can take place.

Although a particular embodiment of the invention has been set forth for purposes of illustration, various changes and modifications may be made therein as will be apparent to a person skilled in the art. The invention is to be limited only in accordance with the following claims when interpreted in view of the prior art.

What I claim is:

1. In combination with an automobile or the like having a drive shaft, a brake shoe engaging said drive shaft, setting means to set the brake shoe against said drive shaft for stopping rotation thereof, means to selectively shift said setting means into setting position or releasing position, means associated with said drive shaft for causing said setting means to set the brake shoe for stopping rotation of the drive shaft when said setting means is in setting position and means associated with said drive shaft for causing said setting means to release the brake when in releasing position.

2. In combination with an automobile or the like having a drive shaft, a brake shoe engaging said drive shaft, setting means to set the brake shoe against said drive shaft for stopping rotation thereof, means to selectively shift said setting means into setting position or releasing position, means associated with said drive shaft for causing said setting means to set the brake shoe for stopping rotation of the drive shaft when said setting means is in setting position, means associated with said drive shaft for causing said setting means to release the brake when in releasing position and means to lock said setting means in said setting position.

3. In combination with an automobile or the like having a drive shaft, a brake shoe engaging said drive shaft, setting means to set the brake shoe against said drive shaft for stopping rotation thereof, means to selectively shift said setting means into setting position or releasing position, means associated with said drive shaft for causing said setting means to set the brake shoe for stopping rotation of the drive shaft when said setting means is in setting position, means associated with said drive shaft for causing said setting means to release the brake when in releasing position and means to lock said setting means in either setting or releasing position.

4. In combination with an automobile or the like having a drive shaft, a brake shoe operatively associated with said drive shaft, setting means to set the brake shoe for stopping rotation of said shaft, means to selectively shift said setting means between setting, releasing and neutral positions, means associated with said drive shaft and responsive to rotation of said drive shaft to cause said setting means to set said brake shoe when in setting position, means associated with said drive shaft and responsive to rotation thereof for causing said setting means to release the brake shoe when in releasing position and means locking said setting means in said setting position.

5. In combination with an automobile or the like having a drive shaft, a brake shoe operatively associated with said drive shaft, setting means to set the brake shoe for stopping rotation of said shaft, a control means mounted in an accessible position in said automobile to selectively shift said setting means between setting, releasing and neutral positions, means associated with said drive shaft and responsive to rotation of said drive shaft to cause said setting means to set said brake shoe when in setting position, means associated with said drive shaft and responsive to rotation thereof for causing said setting means to release the brake shoe when in releasing position and means locking said setting means in said setting position.

6. In combination with an automobile or the like having a drive shaft, a brake shoe operatively associated with said drive shaft and setting means for setting the brake shoe to stop rotation of the drive shaft, said setting means comprising a threaded member adapted to advance said brake shoe against the drive shaft, means establishing driving connection between said threaded member and said drive shaft whereby rotation of the drive shaft supplies power for setting the brake shoe and means for selectively establishing reverse driving connection between said threaded member and said drive shaft whereby rotation of said shaft also supplies power to release said brake.

7. In combination with an automobile or the like having a drive shaft, a brake shoe operatively associated with said drive shaft and setting means for setting the brake shoe to stop rotation of the drive shaft comprising a ratchet wheel, pawls actuated by rotation of said drive shaft to feed said ratchet wheel, and means to selectively bring said pawls into operating position whereby power is supplied from said shaft for setting the brake or for releasing the brake.

8. In combination with an automobile or the like having a drive shaft, a brake shoe operatively associated with said drive shaft and setting means for setting the brake shoe to stop rotation of the drive shaft comprising a ratchet wheel, pawls actuated by rotation of said drive shaft to feed said ratchet wheel, and means to selectively bring said pawls into operating position whereby power is supplied from said shaft for setting the brake or for releasing the brake and means to lock said pawls in selected position.

9. In combination with an automobile or the like having a drive shaft, a brake shoe operatively associated with said drive shaft and setting means for setting the brake shoe to stop rotation of the drive shaft, said setting means comprising a threaded member adapted to advance said brake shoe for setting the same, a reversible ratchet mechanism for reversibly operating said threaded member and means to establish driving connection between said ratchet mechanism and said drive shaft for supplying power from said drive shaft for setting the brake.

WILLIAM B. GRUBB, Sr.